C. M. SPENCER.
MACHINE FOR TAPPING COUPLINGS.
APPLICATION FILED FEB. 9, 1912.
1,045,208.
Patented Nov. 26, 1912.
3 SHEETS—SHEET 1.
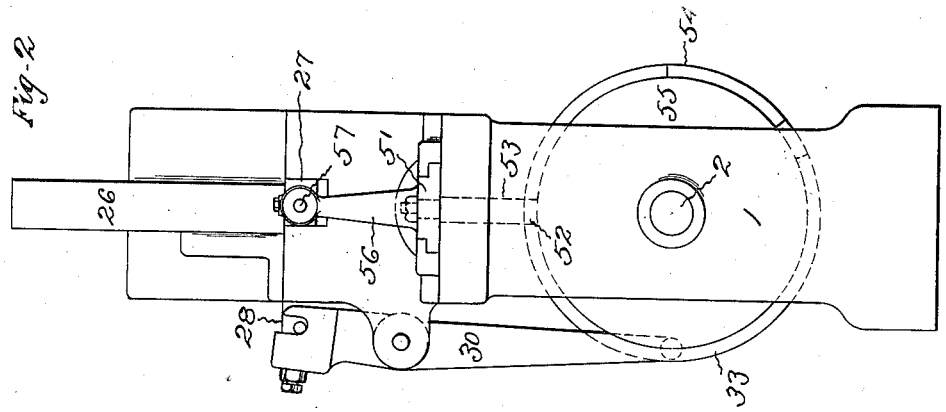
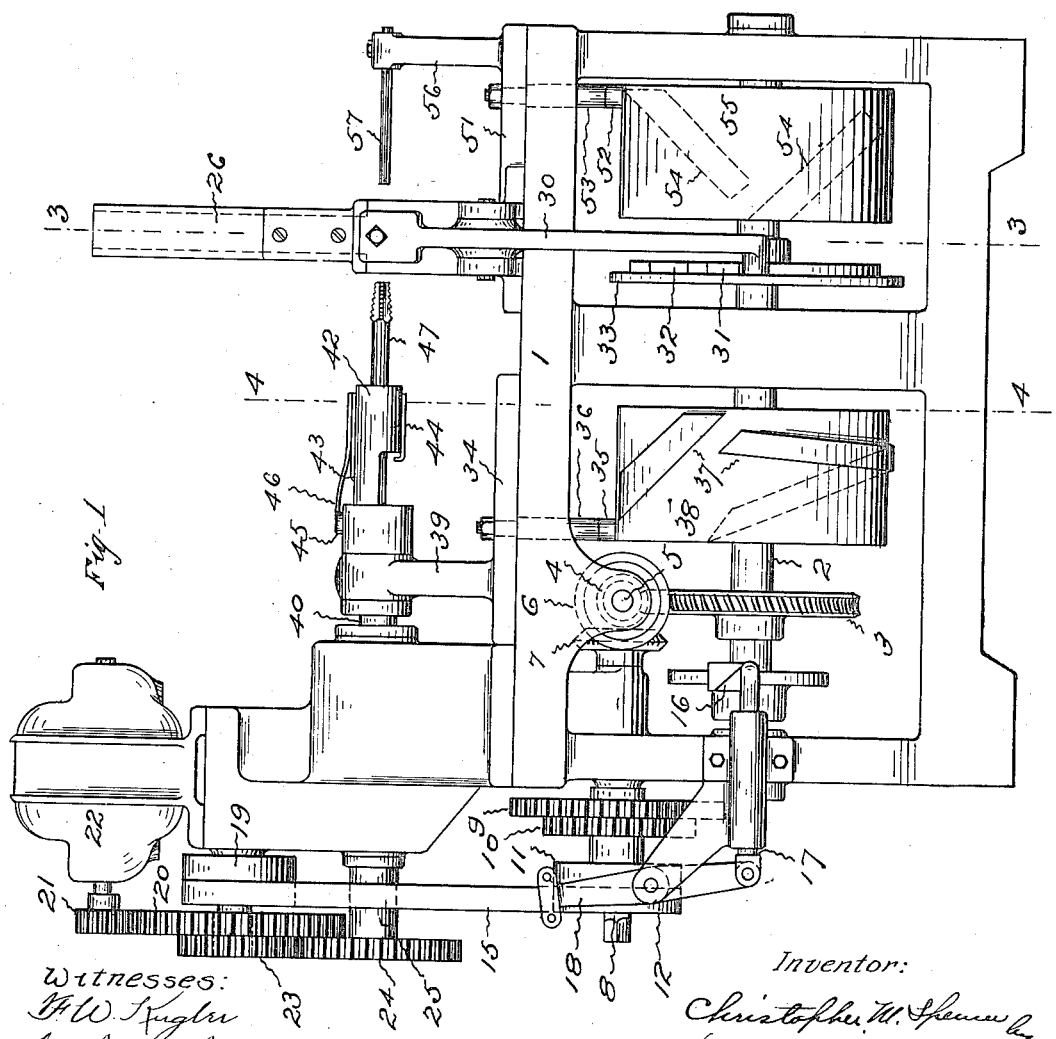
Witnesses:
Inventor:
Christopher M. Spencer
by Harry R. Williams
atty.

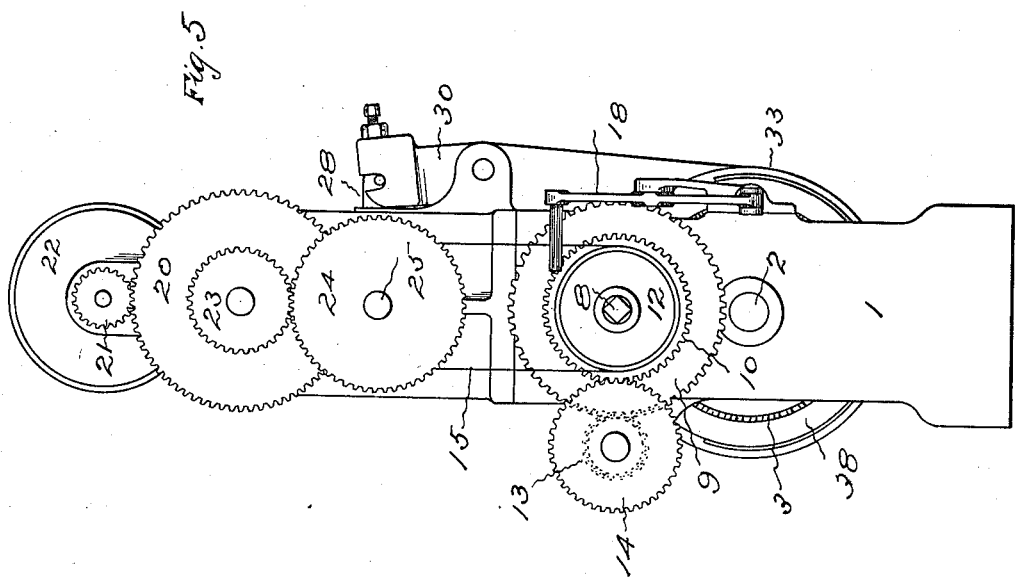
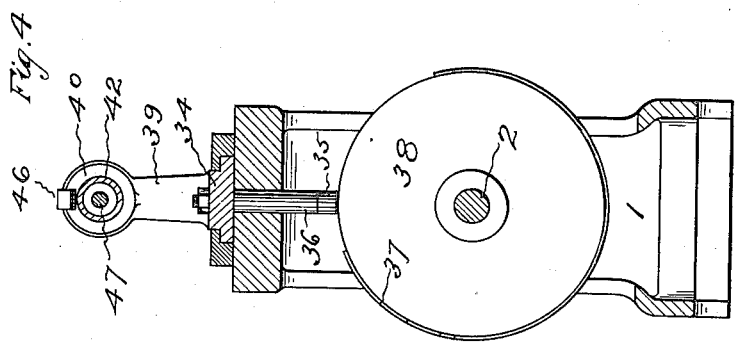
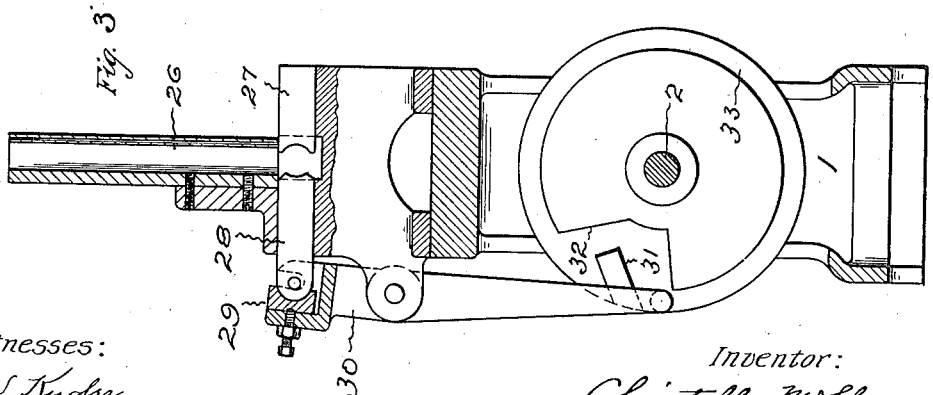

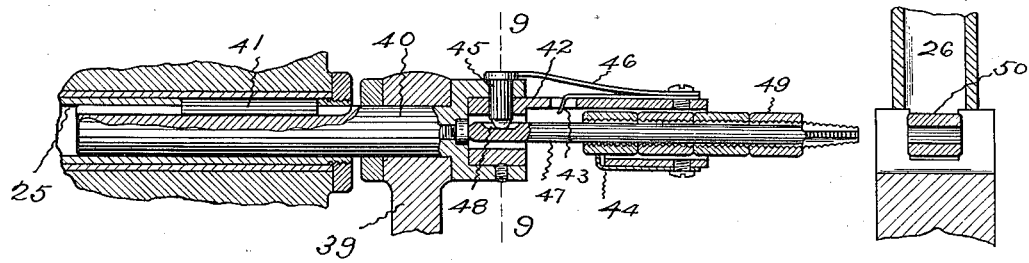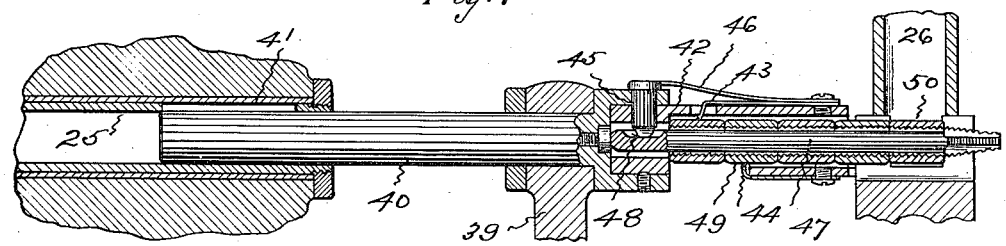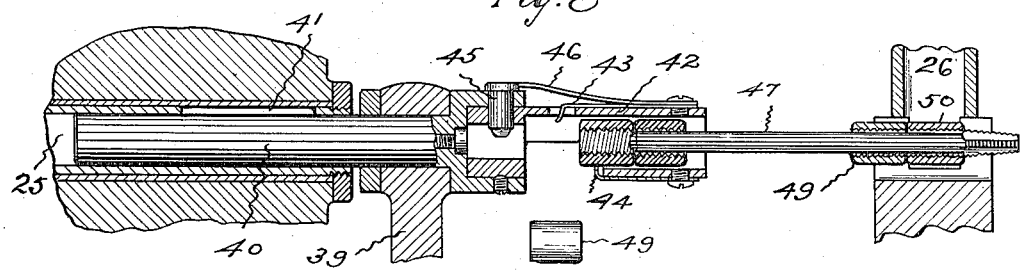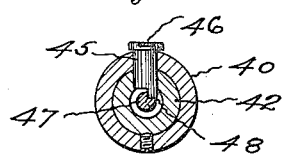

UNITED STATES PATENT OFFICE.

CHRISTOPHER M. SPENCER, OF HARTFORD, CONNECTICUT, ASSIGNOR TO THE UNIVERSAL MACHINE SCREW COMPANY, OF HARTFORD, CONNECTICUT, A CORPORATION OF CONNECTICUT.

MACHINE FOR TAPPING COUPLINGS.

1,045,208.      Specification of Letters Patent.      Patented Nov. 26, 1912.

Application filed February 9, 1912. Serial No. 676,615.

*To all whom it may concern:*

Be it known that I, CHRISTOPHER M. SPENCER, a citizen of the United States, residing at Hartford, in the county of Hartford and State of Connecticut, have invented a new and useful Improvement in Machines for Tapping Couplings, of which the following is a specification.

This invention relates to a machine which is designed to tap threads in the interior of hollow metal bodies.

The machine illustrated as embodying the invention is particularly adapted for threading couplings.

The object of the invention is to provide an automatic machine of this class which is very simple, accurate and rapid.

This machine has a magazine which receives and automatically presents the couplings one at a time in rapid succession to a clamp which is in alinement with the tap. The tap when fed to the work is connected with a spindle which is rotated continuously in one direction, and which feeds the tap completely through the clamped coupling and then backs off, leaving the tap held by the coupling which it has threaded. After the spindle and tap are sufficiently separated to allow a threaded coupling which has been pushed along the tap by the succeeding couplings to be stripped off the shank end, the tap is forced back into engagement with the spindle so as to be again rotated and fed up for tapping the following coupling that is clamped at the bottom of the magazine.

Figure 1 of the accompanying drawings shows a front elevation of the machine. Fig. 2 shows an elevation of the right hand end of the machine. Fig. 3 shows a transverse section on the plane indicated by the dotted line 3—3 on Fig. 1. Fig. 4 shows a transverse section on the plane indicated by the dotted line 4—4 on Fig. 1. Fig. 5 shows an elevation of the left hand end of the machine. Fig. 6 is a section on larger scale showing the spindle, the tap and the connected parts. Fig. 7 is a similar view showing the spindle and the tap in another position. Fig. 8 is a section showing the same parts in still another relation. Fig. 9 is a transverse section on the plane indicated by the dotted line 9—9 on Fig. 6.

The machine is mounted on a suitable frame 1. Supported by the frame below the top is a cam shaft 2, bearing a worm wheel 3. This worm wheel is engaged by a worm 4 on a shaft 5 that has a beveled gear 6 which is in mesh with a beveled gear 7 on a shaft 8. On this shaft, outside of the frame is a gear 9, and by the side of this gear is a gear 10. The latter gear and the pulley 11 are fixed on a hub that turns on the shaft 8 to which the pulley 12 is fixed. (Fig. 1). The gear 9 engages a pinion 13 that is fastened to a gear 14 which engages the gear 10. (Fig. 5). When the belt 15 is on the pulley 12, the shaft is driven direct, and when the belt is on the pulley 11, the shaft is driven at a relatively slower speed through the back gearing. On the cam shaft is a cam 16 which is arranged to engage a rod 17 that is connected with the belt shifter 18. (Fig. 1). By means of this mechanism, the belt is shifted from one pulley to the other for changing the speed. The driving belt in the machine illustrated runs over a pulley 19 that is on a shaft bearing a gear 20, meshing with which is a pinion 21 on the shaft of the electric motor 22. At the side of the gear 20 is a gear 23 which meshes with a gear 24 on the spindle rotating shaft 25. (Figs. 1, 5).

Mounted on top of the frame is a vertical magazine 26. The couplings to be threaded are placed one above the other in this magazine. At the bottom of the magazine there is a stationary clamp jaw 27 at the back and a movable clamp jaw 28 at the front. The forward end of the movable jaw is engaged by an adjustable bed block 29 carried by the upper end of the lever 30 that is oscillated by the cams 31 and 32 on the cam disk 33, which is mounted on the cam shaft. (Fig. 3). These cams with this lever move the front jaw back and forth at the proper times for clamping and releasing the lowest coupling of the pile in the magazine.

The tap spindle slide 34 is moved back and forth upon the top of the frame by the engagement with the roll 35 on the stud 36 of the cams 37 on the cam drum 38. (Figs. 1, 4). The upper end of the bracket 39 on this slide carries a spindle 40 which is free to rotate in a bearing in the upper end of the bracket, but is moved longitudinally with the bracket and slide. This spindle is connected by a spline 41 with the tubular spindle driving shaft 25 so that while the spindle is free to be moved back and forth, it is rotated by the driving shaft. (Figs. 6, 7, 8). One end of the tubular coupling guide 42 is fastened in the enlarged end of the spindle so that these parts will rotate together. One side of this tubular guide is cut away to permit the threaded couplings to drop out. Projecting into the guide from the top is a spring 43 which is designed to eject a coupling which has been freed from the tap shank. Projecting into the opening in the guide from the bottom is a spring 44 which is designed to insure the stripping of the couplings from the shank of the tap at the proper time. Projecting through the end of the spindle and into the guide, is a pin 45 which is yieldingly held down by a spring 46 that is fastened to the top of the guide. (Figs. 6, 7, 8).

The shank of the tap 47 projects into the guide beneath the pin 45, and the end of the pin is shaped to engage a socket 48 in the end of the tap shank for the purpose of causing the tap to rotate with the spindle. The end of the spring pressed connecting pin and the end of the tap shank, and the socket therein, are so shaped that when a separating pull is sufficiently strong, the tap shank will be disengaged from the spring pin and spindle, and on the contrary when an engaging push is sufficiently strong, these parts will be engaged and operatively connected. When the spindle slide is about to move forward for causing the tap to thread the interior of a coupling, the parts are in the position shown in Fig. 6. At this time the end of the spring pin projects into the socket in the end of the shank of the tap so that the tap will be rotated by the spindle. On the shank of the tap are couplings 49 which have been threaded. These couplings support the tap and guide it toward the coupling 50 that is held by the clamp jaws at the bottom of the magazine and is the next to be threaded. As the slide carries the spindle and tap forward for threading the coupling clamped by the jaws at the bottom of the magazine, the couplings already on the shank of the tap are pushed back, and when the tap has passed through the clamped coupling, the parts are in the position shown in Fig. 7.

Instead of rotating the tap in the opposite direction for unscrewing it from the coupling or turning the coupling off from the tap, the last coupling threaded is held by the clamp jaws until after the spindle slide has commenced to move back. As the last coupling threaded is still clamped and the tap cannot be drawn back through it the tap is held from longitudinal movement. This causes the shank of the tap to disengage from the spring holding pin and permits the spindle to be separated from and withdrawn from the end of the tap shank. When the separation has been sufficient, the inmost coupling is freed from the end of the tap shank and drops through the opening in the tubular coupling guide out of the machine, as shown in Fig. 8. After this coupling has been stripped from the shank of the tap and has dropped down, the clamp at the bottom of the magazine releases the coupling which was last threaded. At this time the slide 51 is moved up by the engagement with the roll 52 on the stud 53, of the cams 54 on the cam drum 55. The upper end of the bracket 56 of this slide carries a rod 57. (Figs. 1, 2). These cams are so timed that after the separation of the spindle and tap has been great enough to permit the stripping from the end of the tap shank of a coupling, the pushing slide is moved so that the rod 57 engages the end of the tap and pushes the tap back into the spindle until its end is engaged by the spring pressed connecting pin. The tap in this movement carries the coupling which it last threaded and is now released from the clamp jaws away from the magazine, and then after the tap pushing rod is returned, another coupling drops down between the clamp jaws in position to be threaded.

In this machine the tap spindle is always rotated in one direction, and this rotation may be at comparatively high speed. It is unnecessary to reverse the tap for withdrawing it from the coupling, or to rotate the coupling for the purpose of unscrewing it from the tap. The tap runs completely through the couplings with one movement, and the couplings are pushed along the tap shank until they are stripped off the end of the shank and thus escape from the machine. As a result of this much time is saved and the machine is consequently very efficient.

The invention claimed is:

1. A machine for threading the interiors of hollow metal bodies, having a clamp for holding the bodies while they are being threaded, a spindle, mechanism for rotating the spindle continuously in one direction, mechanism for feeding and returning the spindle longitudinally, a tap for threading the bodies, means detachably connecting the shank of the tap and the spindle so that they will rotate and feed to the work together, but will separate at the end of the feed and permit the independent return of the spindle, a guide surrounding the tap shank and having an opening sufficiently large to receive the bodies tapped, attached to the spindle, mechanism for causing the clamp to hold the bodies until after they are threaded and the tap shank has been separated from the spindle, mechanism for returning the tap longitudinally independently of the spindle, and mechanism for releasing the clamp and allowing the tap to carry away the tapped bodies on its shank when it is returned.

2. A machine for threading the interior of hollow metal bodies, having a magazine for holding the bodies, clamp jaws at the bottom of the magazine for holding the bodies to be threaded, a spindle, mechanism for continuously rotating the spindle in one direction, mechanism for feeding and returning the spindle longitudinally, a tap for threading the bodies, means detachably connecting the shank of the tap and the spindle so that they will rotate and feed to the work together, but will separate at the end of the feed and permit the independent return of the spindle, a guide surrounding the tap shank and having an opening sufficiently large to receive the bodies tapped, attached to the spindle, mechanism for causing the jaws to clamp the bodies until after they are threaded and the tap shank is separated from the spindle, mechanism for returning the tap longitudinally independently of the spindle, and mechanism for releasing the jaws and allowing the tap to carry away the tapped bodies on its shank when it is returned.

3. A machine for threading the interior of hollow metal bodies, having a clamp for holding the body to be threaded, a slide movable toward and from the clamp, mechanism for moving the slide, a spindle movable longitudinally with the slide, mechanism for rotating the spindle continuously in one direction, a guide carried by the spindle and slide, said guide having a discharge opening in one side, a tap for threading the body held by the clamp, the shank of said tap projecting into said guide, means carried by the spindle for connecting the tap shank with the spindle, said means being adapted to release the tap shank from the spindle and cause their separation when the spindle is held, and a slide adapted to move the tap and cause its shank to be reconnected with the spindle.

4. A machine for threading the interior of hollow metal bodies, having a clamp for holding the bodies while they are being threaded, a spindle, mechanism for rotating the spindle continuously in one direction, mechanism for feeding and returning the spindle longitudinally, a guide carried by the spindle, said guide having a discharge opening in one side, a tap for threading the bodies held by the clamp, means detachably connecting the shank of the tap and the spindle so that they will rotate and feed to the work together, but will separate at the end of the feed and permit the independent return of the spindle, and mechanism for returning the tap and threaded bodies thereon longitudinally and independently of the spindle.

5. A tapping machine having a clamp for holding the part to be tapped, a tap, a slide adapted to advance the tap longitudinally through the part to be threaded, mechanism for rotating the tap, means detachably connecting the tap shank and the rotating mechanism while the tap is being advanced by the slide through the part to be threaded, means for causing the clamp to hold the part after it is threaded until the slide has moved back and separated the tap shank from the rotating mechanism, and mechanism for moving back the tap and threaded part and causing a re-connection of the tap shank with the mechanism for rotating the tap.

6. A tapping machine having a spindle, mechanism for rotating the spindle continuously in one direction, mechanism for advancing and returning the spindle, said spindle being hollow at one end and having an opening through one side near that end, a tap with its shank extending into the hollow end of the spindle and detachably connected therewith, jaws clamping the work while it is being tapped and until the spindle has returned and caused a separation of the spindle and tap shank, and mechanism for returning the tap with the part that has been tapped on its shank and causing a reëngagement of the tap shank and the spindle.

7. A tapping machine having a tap, mechanism for rotating the tap and feeding it up to the work, mechanism for holding the work while it is being tapped and causing the tap to be separated from its rotating means, mechanism for releasing the work after the tap has been separated from its rotating means, and mechanism for returning the tap with the threaded part on its shank, whereby the tap is restrained by the work and caused to be separated from its rotating and feeding means, and the work is passed along and ejected from the shank of the tap when it is separated from its rotating means.

CHRISTOPHER M. SPENCER.

Witnesses:
JOSEPHINE M. STREMPFER,
HARRY R. WILLIAMS.